(12) United States Patent
Chae et al.

(10) Patent No.: US 10,656,410 B2
(45) Date of Patent: May 19, 2020

(54) IMAGING LENS, CAMERA MODULE AND DIGITAL DEVICE COMPRISING SAME

(71) Applicant: LG INNOTEK CO., LTD., Seoul (KR)

(72) Inventors: Kyung Pil Chae, Seoul (KR); Bum Keun Kim, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 0 days.

(21) Appl. No.: 15/555,423

(22) PCT Filed: Mar. 3, 2016

(86) PCT No.: PCT/KR2016/002108
§ 371 (c)(1),
(2) Date: Sep. 1, 2017

(87) PCT Pub. No.: WO2016/140520
PCT Pub. Date: Sep. 9, 2016

(65) Prior Publication Data
US 2018/0045952 A1    Feb. 15, 2018

(30) Foreign Application Priority Data

Mar. 4, 2015 (KR) .................. 10-2015-0030144
Mar. 4, 2015 (KR) .................. 10-2015-0030145

(51) Int. Cl.
*G02B 27/00* (2006.01)
*G02B 9/62* (2006.01)
(Continued)

(52) U.S. Cl.
CPC .......... *G02B 27/0006* (2013.01); *G02B 9/62* (2013.01); *G02B 13/0045* (2013.01);
(Continued)

(58) Field of Classification Search
CPC ...................................................... G02B 9/62
See application file for complete search history.

(56) References Cited

U.S. PATENT DOCUMENTS 8,908,295 B1 * 12/2014 Tsai .................. G02B 9/60
359/757
8,953,254 B2 * 2/2015 Okano ............... G02B 13/0045
359/713

(Continued)

FOREIGN PATENT DOCUMENTS

JP            2010-60692 A       3/2010
KR     10-2010-0114167 A     10/2010
(Continued)

*Primary Examiner* — Noam Reisner
(74) *Attorney, Agent, or Firm* — Birch, Stewart, Kolasch & Birch, LLP

(57) ABSTRACT

One embodiment provides an imaging lens comprising at least a first lens to a fourth lens which have refractive power and are disposed in order from an object-side to an image formation-side, wherein a protection lens is disposed on the front surface of a first surface of the first lens, the first surface being in the direction of the object-side, wherein the protection lens has a thickness of 1.2 millimeters or less and an effective size of 22 millimeters or more; the diameter thereof in the direction of the object-side is greater than the diameter thereof in the direction of the image formation-side; and the protection lens is disposed within 3 millimeters from the first lens.

13 Claims, 5 Drawing Sheets

(51) Int. Cl.
*G03B 9/02* (2006.01)
*G03B 9/08* (2006.01)
*G02B 13/06* (2006.01)
*G02B 13/00* (2006.01)
*G02B 5/20* (2006.01)

(52) U.S. Cl.
CPC ............... *G02B 13/06* (2013.01); *G03B 9/02* (2013.01); *G02B 5/208* (2013.01); *G03B 9/08* (2013.01)

(56) References Cited

U.S. PATENT DOCUMENTS

| | | | |
|---|---|---|---|
| 2009/0008683 A1* | 1/2009 | Nishizawa | H01L 27/14618 257/292 |
| 2011/0141581 A1 | 6/2011 | Lee | |
| 2011/0303484 A1 | 12/2011 | Stoffels et al. | |
| 2012/0194726 A1* | 8/2012 | Huang | G02B 13/0045 348/340 |
| 2014/0139931 A1* | 5/2014 | Kubota | G02B 9/62 359/689 |
| 2014/0153113 A1* | 6/2014 | Tsai | G02B 13/18 359/713 |
| 2015/0015765 A1 | 1/2015 | Lee | |
| 2015/0370038 A1* | 12/2015 | Sun | G02B 9/62 359/757 |

FOREIGN PATENT DOCUMENTS

| | | |
|---|---|---|
| KR | 10-2011-0068108 A | 6/2011 |
| KR | 10-2014-0084569 A | 7/2014 |
| KR | 10-2015-0007150 A | 1/2015 |

* cited by examiner

[Fig. 1]
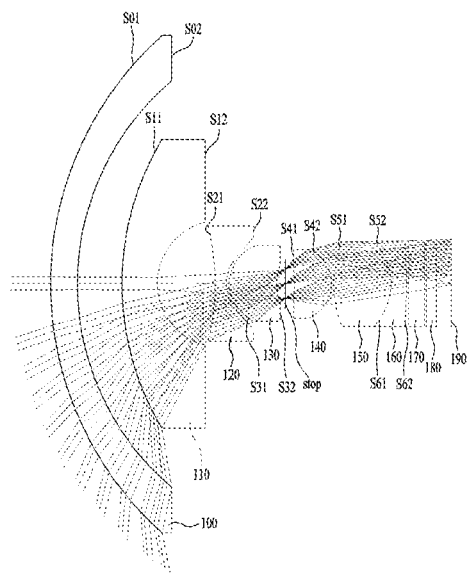
[Fig. 2]
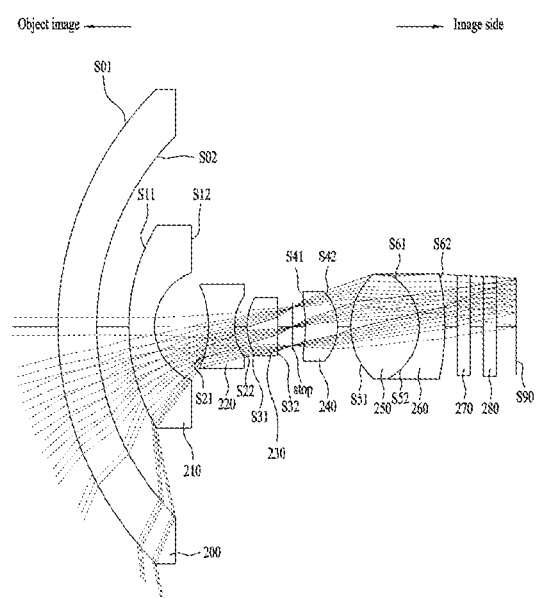

[Fig. 3]
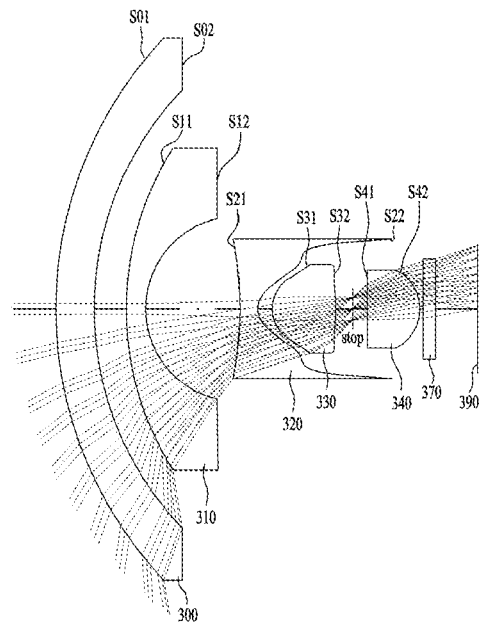
[Fig. 4]
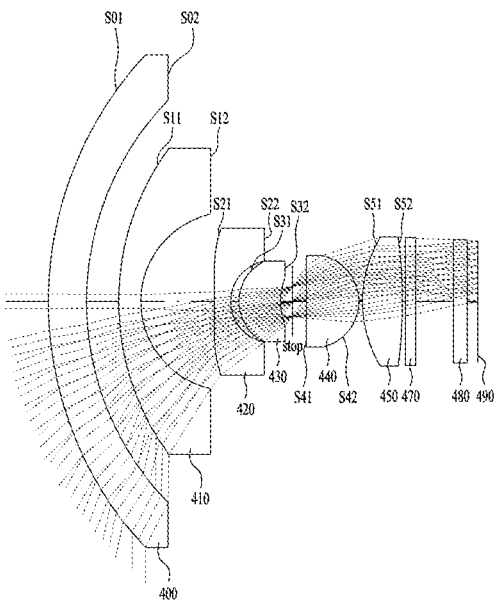

[Fig. 5]
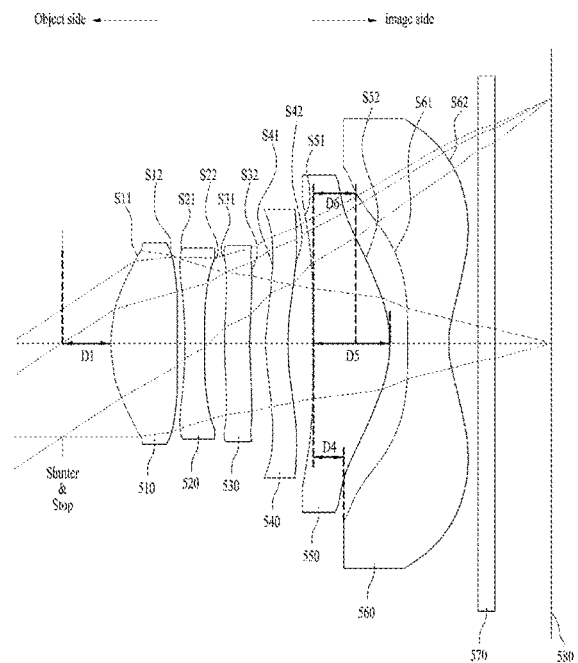
[Fig. 6]
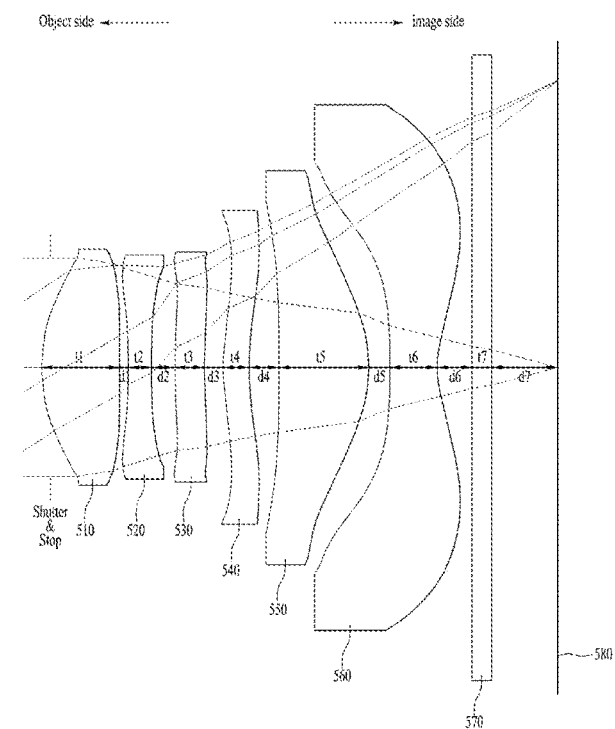

[Fig. 7]
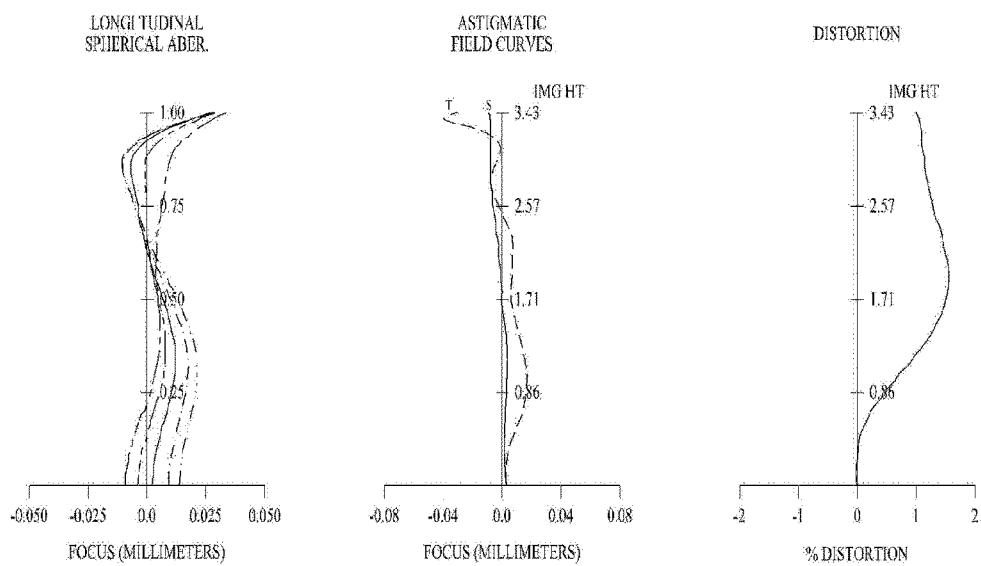
[Fig. 8]
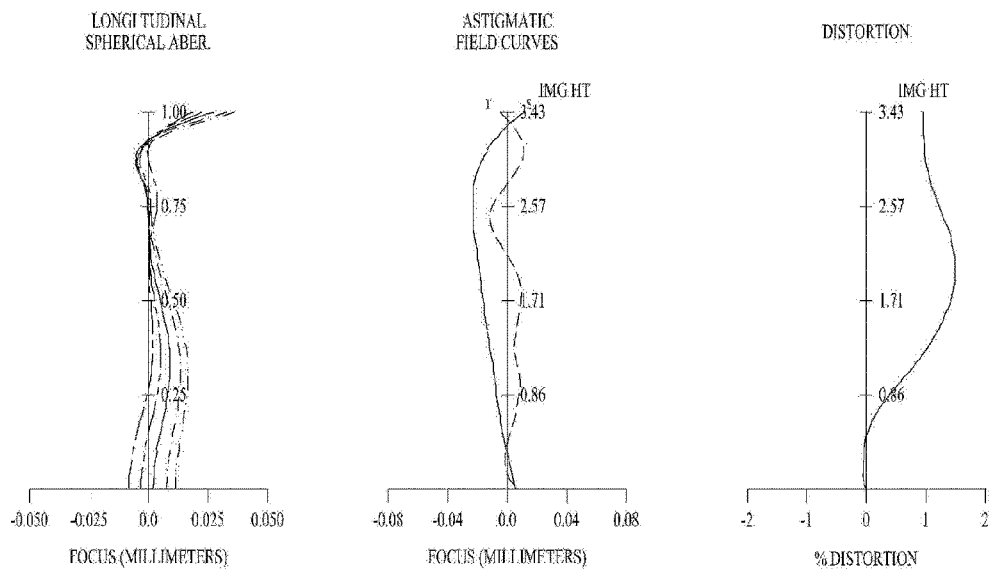

[Fig. 9]
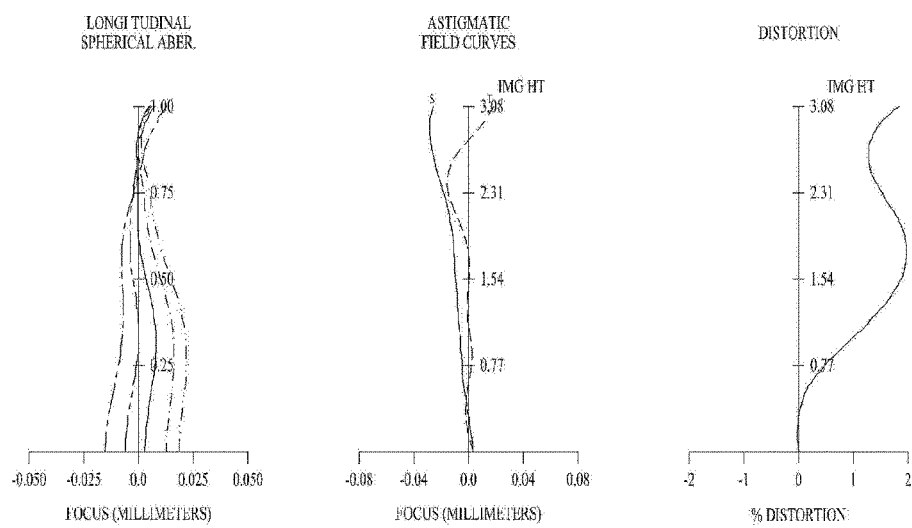

IMAGING LENS, CAMERA MODULE AND DIGITAL DEVICE COMPRISING SAME

CROSS REFERENCE TO RELATED APPLICATIONS

This application is the National Phase of PCT International Application No. PCT/KR2016/002108, filed on Mar. 3, 2016, which claims priority under 35 U.S.C. 119(a) to Patent Application Nos. 10-2015-0030144 and 10-2015-0030145, filed in the Republic of Korea on Mar. 4, 2015, all of which are hereby expressly incorporated by reference into the present application.

TECHNICAL FIELD

Embodiments relate to an imaging lens.

BACKGROUND ART

A conventional film camera has been replaced by a camera module for a portable terminal using a small solid-state imaging device such as a CCD and a CMOS, a digital still camera (DSC), a camcorder, and a PC camera (an imaging device attached to a personal computer). Such imaging devices have been reduced in size and thinned.

In keeping with this trend, miniaturization of light receiving elements such as a Charge Coupled Device (CCD) mounted on a miniaturized imaging device is progressing, but the imaging lens still occupies the largest space in the imaging device.

Therefore, the imaging lens, which forms an image of an object, at the center of the issue of compact and thin design among other elements of the imaging device.

Here, realizing a small imaging lens is not the only issue. With enhancement in performance of the light receiving element, the imaging lenses are also required to exhibit high performance. However, the compact design of the imaging lens necessarily results in a close distance to the light receiving element, which causes light to be obliquely incident on the imaging surface of the imaging device. Thereby, the condensing performance of the imaging lens is not sufficiently exhibited, and brightness of the image may drastically change from the central portion of the image to the peripheral portion of the image.

A wide-angle imaging lens is manufactured with a subject side surface of a lens disposed closest to a subject protruding, in order to realize a wide angle. When the protruding lens disposed on the surface of the imaging lens is contaminated or scratched, cannot be replaced. As a result, lens performance may be deteriorated.

In view of such a problem, it is necessary to increase the number of lenses, which may increase the volume of the imaging device.

DISCLOSURE

Technical Problem

Embodiments are intended to prevent damage to wide angle lenses, particularly, a first lens.

Embodiments provide an imaging lens having high performance and an ultra-thin thickness.

Technical Solution

In one embodiment, an imaging lens includes at least a first lens to a fourth lens arranged in order from an object side to an image side and having a refractive power, wherein a protective lens is disposed on a entirety of a first surface of the first lens directed to the object side, wherein the protective lens has a thickness of 1.2 millimeters or less, an effective diameter of 22 millimeters or more, and a diameter on the object side greater than a diameter on the image side, and is within 3 millimeters of the first lens.

A curvature of the first surface of the first lens on the object side may be greater than 0.04 and less than 0.1.

A radius of curvature of the first surface of the first lens on the object side may be greater than 0.04 and less than 0.1.

A radius of curvature of a second surface of the first lens on the image side may be greater than 0.04 and less than 0.1.

The first lens may have a negative refractive power.

In another embodiment, an imaging lens includes a first lens to a sixth lens arranged in order from an object side to an image side, wherein the first lens has a positive refractive power, and the second lens and the sixth lens have a negative refractive power, wherein an axial distance from an apex of an object side surface of the fifth lens on an optical axis to an object side surface of an edge of the sixth lens is less than an axial distance from the apex of the object side surface of the fifth lens on the optical axis to an effective diameter on the object side surface of the sixth lens.

The axial distance from the apex of the object side surface of the fifth lens on the optical axis to the object side surface of an edge of the sixth lens may be less than an axial distance from the apex of the object side surface of the fifth lens on the optical axis to the apex of the object side surface of the sixth lens on the optical axis.

An axial distance from the apex of the object side surface of the fifth lens on the optical axis to the apex of the object side surface of the sixth lens on the optical axis may be greater than the axial distance from the apex of the object side surface of the fifth lens on the optical axis to the effective diameter on the object side surface of the sixth lens.

The imaging lens may further include a shutter and an aperture stop disposed in front of an object side surface of the first lens, wherein the shutter and the aperture stop may be spaced apart from each other by 0.4 millimeter or more.

A distance between the fifth lens and the sixth lens on the optical axis may be within 0.1 millimeter.

The first lens may have a meniscus shape convex to the object side.

Both surfaces of the second lens on the object side and the image side may be concave.

Both surfaces of the sixth lens on the object side and the image side may be concave.

In another embodiment, a camera module includes the imaging lens, a filter configured to selectively allow light passed through the imaging lens to be transmitted therethrough according to a wavelength, and a light receiving element configured to receive the light transmitted through the filter.

The light receiving element may be an image sensor, wherein a horizontal length and/or a vertical length of unit pixels of the image sensor may be each 2 micrometers or less.

In another embodiment, a digital device including the camera module is provided.

Advantageous Effects

An imaging lens according to embodiments is provided with a protective lens on a front surface of a first lens. Thereby, the first lens which is convex and position at the front of a wide-angle lens may be prevented from being damaged, and deterioration in optical efficiency may be prevented.

An imaging lens according to embodiments is formed to be very thin while including six lenses. Thereby, the imaging lens may photograph a moving object without distortion of the image.

DESCRIPTION OF DRAWINGS

FIG. 1 is a view showing a first embodiment of an imaging lens.

FIG. 2 is a view showing a second embodiment of the imaging lens.

FIG. 3 is a view showing a third embodiment of the imaging lens.

FIG. 4 is a view showing a fourth embodiment of the imaging lens.

FIG. 5 is a view showing a fifth embodiment of the imaging lens.

FIG. 6 is a view showing thicknesses and spacing distances of the respective lenses in the imaging lens of FIG. 5.

FIG. 7 is a graph depicting aberrations, which include longitudinal spherical aberration, astigmatic field curves, and distortion from left to right in the figure, of the imaging lens according to the fifth embodiment.

FIG. 8 is a graph depicting aberrations, which include longitudinal spherical aberration, astigmatic field curves, and distortion from left to right in the figure, of the imaging lens according to the sixth embodiment.

FIG. 9 is a graph depicting aberrations, which include longitudinal spherical aberration, astigmatic field curves, and distortion from left to right in the figure, of the imaging lens according to the seventh embodiment.

BEST MODE

Hereinafter, embodiments will be described in detail with reference to the accompanying drawings. However, the embodiments may be modified into various other forms, and the scope of the disclosure should not be construed as being limited to the embodiments described below. The embodiments are provided to enable those skilled in the art to more fully understand the present disclosure. In the description of the embodiments, the term "object surface" refers to a surface of a lens facing the object side with respect to an optical axis, and the term "image surface" refers to a surface of the lens facing the image side.

Further, in the description, "+ power" of the lens represents a converging lens for converging parallel light, and "− power" of the lens represents a diverging lens for diverging parallel light.

FIG. 1 is a view showing configuration of a first embodiment of an imaging lens.

Referring to FIG. 1, the first embodiment of an imaging lens includes a protective lens 100, a first lens 110, a second lens 120, a third lens 130, a fourth lens 140, a fifth lens 150, and a sixth lens 160, arranged in this order from the object side to the image side. An aperture stop may be disposed between the third lens 130 and the fourth lens 140. In addition, a filter 170, a cover glass 180, and a light receiving element 190 may be provided in order, thereby forming an imaging lens in a camera module.

The light receiving element 190 may be an image sensor, and the width and height of the unit pixel of the image sensor may be less than or equal to 2 μm. The above-described embodiment and the following embodiments may provide an imaging lens applicable to a camera module having large pixels and/or a large number of pixels, and the above-described camera module may include an image sensor or a light receiving element having large pixels and/or a large number of pixels. In this case, the width and height of the unit pixel may be less than or equal to 2 μm.

In FIG. 1, 'S01' is the object surface of the protective lens 100, 'S02' is the image surface of the protective lens 100, 'S11' is the object surface of the first lens 110, 'S12' is the image surface of the first lens 120, 'S21' is the object surface of the second lens 120, 'S22' is the image surface of the second lens 120, 'S31' is the object surface of the third lens 130, 'S32' is the image surface of the third lens 130, 'S41' is the object surface of the fourth lens 140, 'S42' is the image surface of the fourth lens 140, 'S51' is the object surface of the fifth lens 150, 'S52' is the image surface of the fifth lens 150, 'S61' is the object surface of the sixth lens 160, and 'S62' is the image surface of the sixth lens 160.

'Sxy' described above may be similarly applied to other embodiments of the imaging lens described later.

As the filter 170, a flat plate-shaped optical member such as an infrared filter may be provided. The cover glass 180 may be an optical member, for example, a cover glass for protecting the imaging surface. The light receiving element 190 may be an image sensor stacked on a printed circuit board (not shown).

Table 1 shows the curvatures and the thicknesses or distances of the respective lenses of the first embodiment of the imaging lens.

TABLE 1

|  | Curvature | Thickness or distance (mm) |
| --- | --- | --- |
| Object surface of the protective lens (S01) | 15.0000 | 1.2000 |
| Image surface (S02) | 12.0000 | 2.0000 |
| Object surface of the first lens (S11) | 12.7032 | 1.5900 |
| Image surface (S12) | 2.8500 | 2.6000 |
| Object surface of the second lens (S21) | −10.3753 | 0.5000 |
| Image surface (S22) | 1.5076 | 0.1200 |
| Object surface of the third lens (S31) | 1.8350 | 2.1100 |
| Image surface (S32) | 4.0903 | 0.4000 |
| Object surface of the fourth lens (S41) | −28.4671 | 1.6800 |
| Image surface (S42) | −1.4912 | 0.1000 |
| Object surface of the fifth lens (S51) | 5.3168 | 2.5600 |
| Object surface of the sixth lens (S61) | −2.8000 | 0.7000 |
| Image surface (S62) | −26.2307 | 0.1000 |
| Object surface of the filter | Infinity | 0.7000 |
| Image surface | Infinity | 0.1000 |
| Object surface of the cover glass | Infinity | 0.4400 |
| Image surface | Infinity | 0.6712 |

In Table 1, the curvatures of the object surface and image surfaces of the protective lens 100, the first to sixth lenses 110 to 160, the filter 170 and the cover glass 180 are listed in order. The thicknesses corresponding to the respective object surfaces and the distances to adjacent lenses corresponding to the image surfaces are also listed. Since the fifth lens 150 and the sixth lens 160 are in surface contact with each other, the curvature of the image surface S52 of the fifth lens 150 and the distance between the fifth lens 150 and the sixth lens 160 are not listed.

The protective lens 100, the third lens 130, and the fourth lens 140 are formed of plastics, and the first lens 110, the second lens 120, the fifth lens 150, and the sixth lens 160 may be formed of glass.

In this embodiment, the protective lens 100 may have a meniscus shape in which the object surface S01 and the image surface S02 are convex.

The first lens 110 may have a meniscus shape in which the object surface S11 and the image surface S12 are convex. For the second lens 120, the object surface S21 may have a concave shape and the image surface S22 may have a convex shape. The third lens 130 may have a meniscus shape in which the object surface S31 and the image surface S32 are convex. The fourth lens 140 may have a meniscus shape in which the object surface S41 and the image surface S42 are concave. For the fifth lens 150, the object surface S51 may have a convex shape and the image surface S52 may have a concave shape. The sixth lens 160 may have a meniscus shape in which the object surface S61 and the image surface S62 are concave.

The object surface and image surface of each of the lenses 100 and 110 to 160 may be spherical surfaces or at least one of them may be an aspherical surface. When an aspherical surface is formed on at least one surface of the lenses, the lenses may exhibit excellent performance in correcting various aberrations such as spherical aberration, coma aberration and distortion.

FIG. 2 is a view showing configuration of a second embodiment of the imaging lens.

Referring to FIG. 2, the second embodiment of the imaging lens includes a protective lens 200, a first lens 210, a second lens 220, a third lens 230, a fourth lens 240, a fifth lens 250, and a sixth lens 2600, which are arranged in this order from the object side to the image side. An aperture stop may be disposed between the third lens 230 and the fourth lens 240. The second embodiment may also include a filter 270, a cover glass 280, and a light receiving element 290 which are sequentially arranged. Thereby, an imaging lens may be implemented in the camera module.

Hereinafter, among the protective lens 200, the first to sixth lenses 210 to 260, the filter 270, and the cover glass 280, elements different from the first embodiment will be mainly described.

Table 2 shows the curvatures and the thicknesses or distances of the respective lenses in the second embodiment of the imaging lens.

TABLE 2

| | Curvature | Thickness or distance (mm) |
|---|---|---|
| Object surface of the protective lens(S01) | 15.0000 | 1.2000 |
| Image surface (S02) | 12.0000 | 1.0000 |
| Object surface of the first lens (S11) | 9.10000 | 0.8000 |
| Image surface (S12) | 2.4200 | 1.6800 |
| Object surface of the second lens (S21) | −4.6700 | 0.8000 |

TABLE 2-continued

| | Curvature | Thickness or distance (mm) |
|---|---|---|
| Image surface (S22) | 2.4200 | 0.4000 |
| Object surface of the third lens (S31) | 2.2800 | 0.9300 |
| Image surface (S32) | −30.2000 | 0.4600 |
| Object surface of the fourth lens (S41) | −6.4912 | 1.0000 |
| Image surface (S42) | −2.2300 | 0.4000 |
| Object surface of the fifth lens (S51) | 3.2100 | 2.1300 |
| Object surface of the sixth lens (S61) | −2.5500 | 0.8000 |
| Image surface (S62) | −11.2800 | 1.19640 |
| Object surface of the filter | Infinity | 0.4000 |
| Image surface | Infinity | 0.2000 |
| Object surface of the cover glass | Infinity | 0.4873 |
| Image surface | Infinity | −0.0616 |

In Table 2, the curvatures of the object surfaces and image surfaces of the protective lens 200, the first to sixth lenses 210 to 260, the filter 270 and the cover glass 280 are listed in order. The thicknesses corresponding to the respective object surfaces and the distances to adjacent lenses corresponding to the image surfaces are also listed. Since the fifth lens 250 and the sixth lens 260 are in surface contact with each other, the curvature of the image surface S52 of the fifth lens 250 and the distance between the fifth lens 250 and the sixth lens 260 are not listed.

Among the object surfaces and image surfaces of the protective lens 200, the first to sixth lenses 210 to 260, the filter 270 and the cover glass 280, the object surface S32 of the third lens 230 and the image surface of the fourth lens 240 may be aspherical, and all the others may be spherical.

In this embodiment, the protective lens 200 may have a meniscus shape in which the object surface S01 and the image surface S02 are convex.

The first lens 210 may have a meniscus shape in which the object surface S11 and the image surface S12 are convex. For the second lens 220, the object surface S21 may have a concave shape and the image surface S22 may have a convex shape. The third lens 230 may have a meniscus shape in which the object surface S31 and the image surface S32 are convex. The fourth lens 240 may have a meniscus shape in which the object surface S41 and the image surface S42 are concave. For the fifth lens 250, the object surface S51 may have a convex shape and the image surface S52 may have a concave shape. The sixth lens 260 may have a meniscus shape in which the object surface S61 and the image surface S62 are concave.

FIG. 3 is a view showing configuration of a third embodiment of the imaging lens.

Referring to FIG. 3, the third embodiment of the imaging lens includes a protective lens 300, a first lens 310, a second lens 320, a third lens 330, and a fourth lens 440, which are arranged in order. An aperture stop may be disposed between the third lens 330 and the fourth lens 340. The third embodiment may also include a filter 370 and a light receiving element 390 which are arranged in order. Thereby, an imaging lens may be implemented in the camera module.

Hereinafter, among the protective lens 300, the first to fourth lenses 310 to 340, and the filter 370, elements different from the first and second embodiments will be mainly described.

Table 3 shows the curvatures and the thicknesses or distances of the respective lenses in the third embodiment of the imaging lens.

TABLE 3

|  | Curvature | Thickness or distance (mm) |
|---|---|---|
| Object surface of the protective lens (S01) | 15.0000 | 1.2000 |
| Image surface (S02) | 12.0000 | 1.0000 |
| Object surface of the first lens (S11) | 11.50000 | 0.6191 |
| Image surface (S12) | 3.3599 | 2.9482 |
| Object surface of the second lens (S21) | −150.0000 | 0.5500 |
| Image surface (S22) | 0.8566 | 0.4503 |
| Object surface of the third lens (S31) | 1.1871 | 2.0000 |
| Image surface (S32) | −4.2859 | 0.5182 |
| Object surface of the fourth lens (S41) | 8.7011 | 1.6668 |
| Image surface (S42) | −1.2434 | 0.1000 |
| Object surface of the filter | Infinity | 0.4000 |
| Image surface | Infinity | 1.3084 |

In Table 3, the curvatures of the object surfaces and image surfaces of the protective lens 300, the first lens to the fourth lens 310 to 340, and the filter 370 are listed in order. The thicknesses corresponding to the respective object surfaces and the distances to adjacent lenses corresponding to the image surfaces are also listed.

In this embodiment, the protective lens 300 may have a meniscus shape in which the object surface S01 and the image surface S02 are convex.

The first lens 310 may have a meniscus shape in which the object surface S11 and the image surface S12 are convex. For the second lens 320, the object surface S21 may have a concave shape and the image surface S22 may have a convex shape. For the third lens 330, the object surface S31 may have a convex shape and the image surface S32 may have a concave shape. For the fourth lens 440, the object surface S41 may have a convex shape and the image surface S42 may have a concave shape.

FIG. 4 is a view showing configuration of a fourth embodiment of the imaging lens.

Referring to FIG. 4, the fourth embodiment of the imaging lens includes a protective lens 400, a first lens 410, a second lens 420, a third lens 430, a fourth lens 440 and a fifth lens 540, which are arranged in order. An aperture stop may be disposed between the third lens 430 and the fourth lens 440. The fourth embodiment may also include a filter 470, a cover glass 480, and a light receiving element 490, which are arranged in order. Thereby, an imaging lens may be implemented in the camera module.

Hereinafter, among the protective lens 400, the first to fifth lenses 410 to 450, the filter 470, and the cover glass 480, elements different from the embodiments described above will be mainly described.

Table 4 shows the curvatures and the thicknesses or distances of the respective lenses in the fourth embodiment of the imaging lens.

TABLE 4

|  | Curvature | Thickness or distance (mm) |
|---|---|---|
| Object surface of the protective lens(S01) | 15.0000 | 1.2000 |
| Image surface (S02) | 12.0000 | 1.0000 |
| Object surface of the first lens (S11) | 10.24590 | 0.7000 |
| Image surface (S12) | 2.6512 | 2.3042 |
| Object surface of the second lens (S21) | −24.6344 | 0.5112 |
| Image surface (S22) | 1.1971 | 0.2551 |
| Object surface of the third lens (S31) | 1.7269 | 1.3048 |
| Image surface (S32) | 5.0700 | 0.3736 |
| Object surface of the fourth lens (S41) | 21.2147 | 1.6667 |
| Image surface (S42) | −1.5118 | 1.1000 |
| Object surface of the fifth lens (S51) | 5.5581 | 1.2556 |
| Image surface (S52) | −9.5139 | 0.1000 |
| Object surface of the filter | Infinity | 0.3169 |
| Image surface | Infinity | 1.1884 |
| Object surface of the cover glass | Infinity | 0.4357 |
| Image surface | Infinity | 0.6208 |

In Table 4, the curvatures of the object surfaces and image surfaces of the protective lens 400, the first to fifth lenses 410 to 450, the filter 470 and the cover glass 480 are listed in order. The thicknesses corresponding to the respective object surfaces and the distances to adjacent lenses corresponding to the image surfaces are also listed.

In this embodiment, the protective lens 400 may have a meniscus shape in which the object surface S01 and the image surface S02 are convex.

The first lens 410 may have a meniscus shape in which the object surface S11 and the image surface S12 are convex. For the second lens 420, the object surface S21 may have a concave shape and the image surface S22 may have a convex shape. For the third lens 430, the object surface S31 may have a convex shape and the image surface S32 may have a concave shape. For the fourth lens 440, the object surface S41 may have a convex shape and the image surface S42 may have a concave shape. For the fifth lens 450, the object surface S41 may have a convex shape and the image surface S42 may have a concave shape.

FIG. 5 is a view showing configuration of a fifth embodiment of the imaging lens. FIG. 6 is a view showing thicknesses and spacing distances of the respective lenses in the imaging lens of FIG. 5.

Referring to FIG. 5, the fifth embodiment of the imaging lens includes a first lens 510, a second lens 520, a third lens 530, a fourth lens 540, a fifth lens 550, and a sixth lens 560, arranged in this order from the object side to the image side.

A shutter and an aperture stop may be provided on the front surface of the first lens 510. The aperture stop may be a variable aperture stop. In addition, a filter glass 570 and a light receiving element 580 may be arranged in order. Thereby, an imaging lens may be implemented in the camera module. A cover glass may be arranged between the filter 570 and the light receiving element 580.

The light receiving element 590 may be an image sensor.

In FIG. 5, 'S11' is the object surface of the first lens 510, 'S12' is the image surface of the first lens 120, 'S21' is the object surface of the second lens 520, 'S22' is the image surface of the second lens 520, 'S31' is the object surface of the third lens 530, 'S32' is the image surface of the third lens 530, 'S41' is the object surface of the fourth lens 540, 'S42' is the image surface of the fourth lens 540, 'S51' is the object surface of the fifth lens 550, 'S52' is the image surface of the fifth lens 550, 'S61' is the object surface of the sixth lens 560, and 'S62' is the image surface of the sixth lens 560.

As the filter 570, a flat plate-shaped optical member such as an infrared filter may be provided. The cover glass may be an optical member, for example, a cover glass for protecting the imaging surface. The light receiving element 590 may be an image sensor stacked on a printed circuit board (not shown).

In this embodiment, the first lens 510 may have a meniscus shape in which the object surface S11 and the image surface S12 are convex to the object side. For the second lens 520, both the object surface S21 and the image surface S22 may have a concave shape. The third lens 530 may be a meniscus shape that is convex to the object side and the fourth lens 540 may have a meniscus shape that is convex to the object side and the fifth lens 550 may have a meniscus shape that is convex to the image side. The sixth lens 560 may have a concave shape in which the object surface S51 and the image surface S62 are both concave.

Some of the object surfaces and image surfaces of the first to sixth lenses 510 to 560 may be aspherical. When an aspherical shape is given to at least one surface of the lenses, the lenses may exhibit excellent performance in correcting various aberrations such as spherical aberration, coma aberration and distortion.

In this embodiment, the first lens 510 may be disposed to have a positive (+) power and the second lens 520 and the sixth lens 560 may be disposed to have a negative (−) power.

In FIG. 5, the spacing distance D1 from the shutter and the aperture stop to the first lens 510 may be greater than 0.40 mm. Even if an ultra-thin imaging lens is implemented, the shutter and the aperture stop need to be spaced from the first lens 510 by a distance greater than the aforementioned value to prevent the first lens 510 from being damaged and achieve a mechanical arrangement.

In order to realize an ultra-thin imaging lens, the lenses are disposed very close to each other on the optical axis. The fifth lens 550 and the sixth lens 560 may be close to each other on the optical axis. Specifically, in FIG. 6, distance d5 may be within 0.1 mm.

In FIG. 5, the axial distance D5 from the apex of the object surface of the fifth lens 550 on the optical axis to the apex of the object surface of the fifth lens 550 on the optical axis and the axial distance D6 from the apex of the object surface of the fifth lens 550 on the optical axis to the effective diameter of the object surface of the sixth lens 560 may satisfy the following condition.

The axial distance D4 from the apex of the object surface of the fifth lens 550 on the optical axis to the edge of the object surface of the sixth lens 560 may be shorter than the distances D5 and D6. Here, the diameter of the edge of the sixth lens 560 may be greater than the effective diameter described above. The effective diameter may refer to an area through which the light is transmitted, the edge of the sixth lens 560 may refer to an area where the surface of the sixth lens 560 has a radius of curvature, and the surface of the sixth lens 560 outside the edge may be flat.

Table 5 shows the curvatures, thicknesses or distances, and refractive indexes of the respective lenses in the fifth embodiment of the imaging lens. Here, a large radius of curvature is given in consideration of only the absolute value of the radius of curvature without considering whether the object side surface is concave or convex, that is, whether the radius of curvature is negative or positive.

TABLE 5

|  | Radius of curvature | Thickness or distance (mm) | Refractive index |
|---|---|---|---|
| Object | Infinity | Infinity |  |
| Aperture stop | Infinity | 0.6 |  |
| Object surface of the first lens (S11) | 1.80634 | 0.815 | 1.544 |
| Image surface (S12) | −3342.67459019 | 0.085 |  |
| Object surface of the second lens (S21) | −6.42755776202 | 0.24 | 1.640 |
| Image surface (S22) | 8.12046557145 | 0.245 |  |
| Object surface of the third lens (S31) | 5.06537130676 | 0.305 | 1.640 |
| Image surface (S32) | 5.62836636619 | 0.2 |  |
| Object surface of the fourth lens (S41) | 2.64527159736 | 0.27 | 1.640 |
| Image surface (S42) | 2.60375820619 | 0.305 |  |
| Object surface of the fifth lens (S51) | −15.4391011638 | 0.935 | 1.531 |
| Image surface (S52) | −1.31832387348 | 0.22 |  |
| Object surface of the sixth lens (S61) | −15.0181522219 | 0.5 | 1.531 |
| Image surface (S62) | 1.29421449257 | 0.3541 |  |
| Filter | Infinity | 0.21 | 1.523 |
| Cover glass | Infinity | 0.6859 |  |

In Table 5, the curvatures of an object, the aperture stop, and the object surfaces and the image surfaces of the first to sixth lenses 510 to 560, the filter 570, and the cover glass 580 are listed in order. A positive (+) curvature indicates curving to the object side and a negative (−) curvature indicates curving toward the light receiving element. A curvature of infinity indicates a flat surface. The table also shows the thickness corresponding to each object surface, and the distance to a lens and the like adjacent to the image surface.

Although not shown, a coating may be applied to the surfaces of each lens to prevent reflection or improve surface hardness.

Table 6 shows the conic constant k and aspherical coefficients A to G of each lens surface. The area having an aspheric coefficient of '0' is not shown.

TABLE 6

|  | k | A | B | C |
|---|---|---|---|---|
| S11 | −1.779032 | 0.329445E−01 | 0.467208E−02 | −0.141255E−01 |
| S12 | 0.000000 | −0.430778E−01 | −0.140789E−0 | 0.143017E−1 |
| S21 | 0.000000 | 0.14789E−02 | 0.158850E−01 | 0.219392E−02 |

TABLE 6-continued

| | | | | |
|---|---|---|---|---|
| S22 | −1.0000000 | 0.163464E−01 | 0.199321E−01 | 0.142886E−03 |
| S31 | 0.0000000 | −0.745082E−01 | 0.126298E−03 | −0.373770E−01 |
| S32 | −29.957801 | −0.584209E−01 | 0.268922E−01 | −0.423259E−01 |
| S41 | 0.491853 | −0.158810E+00 | 0.484107E−1 | −0.940661E−02 |
| S42 | −0.389092 | −0.120398E+01 | 0.222764E−01 | 0.571882E−02 |
| S51 | −1.00000 | 0.257871E−01 | −0.219967E−01 | 0.742478E−03 |
| S52 | −5.305177 | −0.208494E−01 | 0.101184E−01 | −0.260078E−02 |
| S61 | 0.000000 | −0.932115E−01 | 0.124952E−01 | 0.424006E−03 |

| | D | E | F | G |
|---|---|---|---|---|
| S11 | 0.612771E−02 | −0.543120E−04 | −0.371779E−02 | −0.324490E−04 |
| S12 | −0.751391E−02 | 0.187781E−02 | −0.205595E−02 | 0.391443E−03 |
| S21 | 0.50768E−02 | 0.713324E−03 | 0.147300E−02 | −0.990049E−03 |
| S22 | −0.115863E−02 | 0.535671E−02 | −0.328942E−02 | 0.520525E−02 |
| S31 | 0.101475E−01 | 0.873367E−03 | 0.801531E−02 | 0.572008E−03 |
| S32 | 0.181115E−01 | 0.707673E−03 | 0.244681E−02 | |
| S41 | 0.472675E−03 | | | |
| S42 | 0.609616E−04 | −0.506771E−06 | −0.642444E−04 | |
| S51 | 0.151278E−02 | 0.549491E−04 | 0.995068E−05 | −0.235828E−04 |
| S52 | 0.621319E−03 | −0.28764E−05 | −0.667722E−05 | −0.151042E−05 |
| S61 | 0.602496E−04 | 0.281532E−05 | −0.160224E−05 | −0.241581E−06 |

The aspherical coefficients H and J of the object surface S61 of the sixth lens may be −0.345366E−07 and −0.133570E−07, respectively, and the aspherical surface coefficient K of the image surface S62 of the sixth lens may be 7.25557E+00. AR4 may be −7.5151E−02, AR5 may be 1.8339E−02, AR6 may be 9.5930E−03, AR7 may be −1.0238E+03, AR8 may be −2.8552E−03, AR9 may be 1.2132E−04, AR10 may be 4.6243E−04, AR11 may be −1.7769E−05, AR12 may be −3.9786E−05, AR13 may be 1.8887E−06, and AR14 may be 1.0623E−06.

FIG. 7 is a graph depicting aberrations, which are longitudinal spherical aberration, astigmatic field curves, and distortion from left to right in the figure, of the imaging lens according to the fifth embodiment.

In FIG. 7, the Y axis represents the size of an image, the X axis represents the focal length (in mm) and the distortion degree (in %). The closer the curves are to the Y axis, the better the aberration correction function.

Table 7 shows the curvatures, thicknesses or distances, and refractive indexes of the respective lenses in the sixth embodiment of the imaging lens. Here, a large radius of curvature is given in consideration of only the absolute value of the radius of curvature without considering whether the object side surface is concave or convex, that is, whether the radius of curvature is negative or positive.

TABLE 7

| | Radius of curvature | Thickness or distance (mm) | Refractive index |
|---|---|---|---|
| Object | Infinity | Infinity | |
| Aperture stop | Infinity | −0.250000 | |
| Object surface of the first lens (S11) | 1.75682 | 0.758763 | 1.544 |
| Image surface (S12) | 16.66297 | 0.085000 | |
| Object surface of the second lens (S21) | −9.70518 | 0.240000 | 1.640 |
| Image surface (S22) | 7.36635 | 0.248144 | |
| Object surface of the third lens (S31) | 5.01860 | 0.309171 | 1.640 |

TABLE 7-continued

| | Radius of curvature | Thickness or distance (mm) | Refractive index |
|---|---|---|---|
| Image surface (S32) | 5.38791 | 0.280472 | |
| Object surface of the fourth lens (S41) | 2.61040 | 0.281606 | 1.640 |
| Image surface (S42) | 2.56088 | 0.340138 | |
| Object surface of the fifth lens (S51) | −14.50927 | 0.934230 | 1.531 |
| Image surface (S52) | −1.24777 | 0.191879 | |
| Object surface of the sixth lens (S61) | −6.80556 | 0.500000 | 1.531 |
| Image surface (S62) | 1.238569 | 0.354090 | |
| Filter | Infinity | 0.210000 | 1.523 |
| Cover glass | Infinity | 0.716504 | |

In Table 7, the curvatures of an object, the aperture stop, and the object surfaces and the image surfaces of the first to sixth lenses 510 to 560, the filter 570, and the cover glass 580 are listed in order. A positive (+) curvature indicates curving to the object side and a negative (−) curvature indicates curving toward the light receiving element. A curvature of infinity indicates a flat surface. The table also shows the thickness corresponding to each object surface, and the distance to a lens and the like adjacent to the image surface.

Although not shown, a coating may be applied to the surfaces of each lens to prevent reflection or improve surface hardness.

Table 8 shows the conic constant k and aspherical coefficients A to G of each lens surface. Areas having an aspheric coefficient of '0' are not shown.

TABLE 8

| | k | A | B | C |
|---|---|---|---|---|
| S11 | −1.713061 | 0.349086E−01 | 0.692388E−02 | −0.139764E−01 |
| S12 | 0.000000 | −0.396705E−01 | −0.127210E−0 | 0.155935E−1 |
| S21 | 0.000000 | 0.181524E−02 | 0.176521E−01 | 0.262340E−02 |
| S22 | −1.0000000 | 0.194830E−01 | 0.167739E−01 | −0.108661E−03 |
| S31 | 0.0000000 | −0.748956E−01 | −0.430599E−02 | −0.388112E−01 |
| S32 | −26.431761 | −0.542810E−01 | 0.300816E−01 | −0.419710E−01 |
| S41 | 0.491853 | −0.154149E+00 | 0.510206E−1 | −0.887048E−02 |
| S42 | −0.389092 | −0.116488E+01 | 0.221545E−01 | 0.289368E−03 |
| S51 | −1.00000 | 0.274273E−01 | −0.223215E−01 | 0.542088E−03 |
| S52 | −4.851506 | −0.275865E−01 | 0.101726E−01 | −0.240409E−02 |
| S61 | 0.000000 | −0.883690E−01 | 0.131827E−01 | 0.502407E−03 |

| | D | E | F | G |
|---|---|---|---|---|
| S11 | 0.607875E−02 | −0.122057E−04 | −0.348241E−02 | −0.192110E−03 |
| S12 | −0.669939E−02 | 0.216828E−02 | −0.202949E−02 | 0.215926E−03 |
| S21 | 0.533799E−02 | 0.552183E−03 | 0.158830E−02 | −0.754858E−03 |
| S22 | −0.171246E−02 | 0.447822E−02 | −0.378464E−02 | 0.481471E−02 |
| S31 | 0.943528E−01 | 0.481624E−03 | 0.761902E−02 | −0.397647E−03 |
| S32 | 0.181303E−01 | 0.806488E−03 | 0.271661E−02 | |
| S41 | 0.737472E−04 | | | |
| S42 | 0.903024E−04 | −0.143353E−04 | −0.742518E−04 | |
| S51 | 0.147313E−02 | 0.423199E−04 | 0.821725E−05 | −0.234185E−04 |
| S52 | 0.646191E−03 | −0.684517E−06 | −0.674684E−05 | −0.166869E−05 |
| S61 | 0.532746E−04 | 0.770441E−06 | −0.212524E−05 | −0.271358E−06 |

The aspherical coefficients H and J of the object surface S61 of the sixth lens may be −0.296247E−07 and −0.108352E−07, respectively, and the aspherical coefficient K of the image surface S62 of the sixth lens may be −8.6669E+00. AR4 may be −7.7925E−02, AR5 may be 2.0662E−02, AR6 may be 9.8607E−03, AR7 may be −1.1717E+03, AR8 may be −2.9168E−03, AR9 may be 1.0631E−04, AR10 may be 4.6726E−04, AR11 may be −1.5560E−05, AR12 may be −3.9430E−05, AR13 may be 1.8511E−06, and AR14 may be 1.0623E−06.

FIG. 8 is a graph depicting aberrations, which are longitudinal spherical aberration, astigmatic field curves, and distortion from left to right in the figure, of the imaging lens according to the sixth embodiment.

In FIG. 8, the Y axis represents the size of an image, and the X axis represents the focal length (in mm) and the distortion degree (in %). The closer the curves are the Y axis, the better the aberration correction function.

Table 9 shows the curvatures, thicknesses or distances, and refractive indexes of the respective lenses in the sixth embodiment of the imaging lens. Here, a large radius of curvature is given in consideration of only the absolute value of the radius of curvature without considering whether the object side surface is concave or convex, that is, whether the radius of curvature is negative or positive.

TABLE 9

| | Radius of curvature | Thickness or distance (mm) | Refractive index |
|---|---|---|---|
| Object | Infinity | Infinity | |
| Aperture stop | Infinity | −0.250000 | |
| Object surface of the first lens (S11) | 1.75682 | 0.738298 | 1.544 |
| Image surface (S12) | 16.66297 | 0.085000 | |
| Object surface of the second lens (S21) | −9.70518 | 0.250000 | 1.640 |
| Image surface (S22) | 7.36635 | 0.222787 | |
| Object surface of the third lens (S31) | 5.01860 | 0.250000 | 1.640 |
| Image surface (S32) | 5.38791 | 0.174436 | |
| Object surface of the fourth lens (S41) | 2.61040 | 0.309801 | 1.640 |
| Image surface (S42) | 2.56088 | 0.274266 | |
| Object surface of the fifth lens (S51) | −14.50927 | 1.049212 | 1.531 |
| Image surface (S52) | −1.24777 | 0.146200 | |
| Object surface of the sixth lens (S61) | −6.80556 | 0.500000 | 1.531 |
| Image surface (S62) | 1.238569 | 0.462134 | |
| Filter | Infinity | 0.210000 | 1.523 |
| Cover glass | Infinity | 0.627899 | |

In Table 5, the curvatures of an object, the aperture stop, and the object surfaces and the image surfaces of the first to sixth lenses 510 to 560, the filter 570, and the cover glass 580 are listed in order. A positive (+) curvature indicates curving to the object side and a negative (−) curvature indicates curving toward the light receiving element. A curvature of infinity indicates a flat surface. The table also shows the thickness corresponding to each object surface, and the distance to a lens and the like adjacent to the image surface.

Although not shown, a coating may be applied to the surfaces of each lens to prevent reflection or improve surface hardness.

Table 10 shows the conic constant k and aspherical coefficients A to G of each lens surface. Areas having an aspheric coefficient of '0' are not shown.

TABLE 10

| | k | A | B | C |
|---|---|---|---|---|
| S11 | −2.072309 | 0.357836E−01 | 0.215454E−02 | −0.238336E−01 |
| S12 | 0.000000 | −0.536069E−01 | −0.352068E−01 | 0.317356E−1 |
| S21 | 54.094330 | 0.514565E−02 | 0.135438E−01 | −0.273663E−02 |
| S22 | −30.018800 | 0.470596E−01 | 0.117599E−01 | −0.204605E−03 |
| S31 | 109.404168 | −0.397656E−02 | −0.284916E−02 | −0.497829E−01 |
| S32 | −8.266946 | −0.407535E−01 | 0.600141E−01 | −0.639574E−01 |
| S41 | 0.491853 | −0.176022E+00 | 0.636283E−01 | −0.161904E−02 |
| S42 | 0.176629 | −0.112713E+00 | 0.132853E−01 | 0.000000E+00 |
| S51 | 3.077045 | 0.372118E−01 | −0.289360E−01 | −0.626112E−03 |
| S52 | −4.616796 | −0.447513E−01 | 0.122004E−01 | −0.353208E−02 |
| S61 | 0.000000 | −0.117580E−01 | 0.141863E−01 | 0.557476E−03 |

| | D | E | F | G |
|---|---|---|---|---|
| S11 | 0.120178E−01 | −0.639871E−03 | −0.824965E−02 | 0.321061E−03 |
| S12 | −0.179836E−02 | 0.180318E−02 | −0.151140E−02 | −0.866887E−03 |
| S21 | 0.744312E−02 | 0.000000E+00 | 0.000000E+00 | 0.000000E+00 |
| S22 | −0.285040E−02 | 0.135112E−01 | −0.458255E−02 | 0.000000E+00 |
| S31 | 0.366879E−01 | −0.898710E−02 | 0.345489E−02 | 0.000000E+00 |
| S32 | 0.249508E−01 | 0.570802E−03 | 0.113777E−03 | 0.000000E+00 |
| S41 | 0.000000E+00 | 0.000000E+00 | 0.000000E+00 | 0.000000E+00 |
| S42 | 0.000000E+00 | 0.000000E+00 | 0.000000E+00 | 0.000000E+00 |
| S51 | 0.165491E−02 | 0.175363E−05 | 0.540399E−04 | 0.736813E−06 |
| S52 | 0.988021E−03 | 0.172425E−04 | −0.556353E−05 | −0.387630E−05 |
| S61 | 0.862750E−04 | 0.000000E+00 | −0.365220E−05 | 0.000000E+00 |

The aspherical coefficients H and J of the object surfaces of the first to sixth lenses may be 0.000000E+00, and the aspherical coefficient of the image surface S62 of the sixth lens K may be −6.6137E+00. AR4 may be −8.0663E−02, AR5 may be 1.1278E−02, AR6 may be 1.7313E−02, AR7 may be −1.0321E+03, AR8 may be −4.5711E−03, AR9 may be 3.3669E−05, AR10 may be 7.4848E−04, AR11 may be −4.6807E−06, AR12 may be −6.3111E−05, AR13 may be 4.6499E−07, and AR14 may be 2.0030E−06.

FIG. 9 is a graph depicting aberrations, which are longitudinal spherical aberration, astigmatic field curves, and distortion from left to right in the figure, of the imaging lens according to the seventh embodiment.

In FIG. 9, the Y axis represents the size of an image, and the X axis represents the focal length (in mm) and the distortion degree (in %). The closer the curves are to the Y axis, the better the aberration correction function.

The camera module including the imaging lens described above may be installed in various digital devices such as a digital camera, a smartphone, a notebook, and a tablet.

While the present disclosure has been particularly shown and described with reference to embodiments thereof, it is to be understood that the present disclosure is not limited to the disclosed embodiments, but, on the contrary, it will be understood that various modifications and applications are possible within the scope of the present disclosure. For example, each component specifically shown in the embodiments may be modified and implemented. It is to be understood that all changes and modifications that come within the meaning and range of equivalency of the claims are therefore intended to be embraced therein.

INDUSTRIAL APPLICABILITY

An imaging lens according to embodiments may prevent optical efficiency from being lowered and is ultra-thin. Thereby, a moving object may be photographed without distortion of the image.

The invention claimed is:
1. An imaging lens comprising:
a first lens to a sixth lens arranged in order from an object side to an image side,
wherein the first lens has a positive refractive power, and the second lens and the sixth lens have a negative refractive power,
wherein the first lens has a meniscus shape convex to the object side,
wherein both surfaces of the second lens on the object side and the image side are concave,
wherein an axial distance from an apex of an object side surface of the fifth lens on an optical axis to an object side surface of an edge of the sixth lens is less than an axial distance from the apex of the object side surface of the fifth lens on the optical axis to an effective diameter on the object side surface of the sixth lens,
wherein the object side surface of the sixth lens outside the edge is flat,
wherein the third lens has a meniscus shape convex to the object side, and
wherein the fourth lens has a meniscus shape convex to the object side.
2. The imaging lens according to claim 1, wherein the axial distance from the apex of the object side surface of the fifth lens on the optical axis to the object side surface of an edge of the sixth lens is less than an axial distance from the apex of the object side surface of the fifth lens on the optical axis to the apex of the object side surface of the sixth lens on the optical axis.
3. The imaging lens according to claim 1, wherein an axial distance from the apex of the object side surface of the fifth lens on the optical axis to the apex of the object side surface of the sixth lens on the optical axis is greater than the axial distance from the apex of the object side surface of the fifth lens on the optical axis to the effective diameter on the object side surface of the sixth lens.
4. The imaging lens according to claim 1, further comprising:
a shutter and an aperture stop disposed in front of an object side surface of the first lens,
wherein the shutter and the aperture stop are spaced apart from the first lens by 0.4 millimeter or more.

5. The imaging lens according to claim 1, wherein a distance between the fifth lens and the sixth lens on the optical axis is within 0.1 millimeter.

6. The imaging lens according to claim 1, wherein both surfaces of the sixth lens on the object side and the image side are concave.

7. A camera module comprising:
an imaging lens according to claim 1;
a filter configured to selectively allow light passed through the imaging lens to be transmitted therethrough according to a wavelength; and
a light receiving element configured to receive the light transmitted through the filter.

8. The camera module according to claim 7, wherein the light receiving element is an image sensor,
wherein a horizontal length and/or a vertical length of unit pixels of the image sensor are each 2 micrometers or less.

9. The camera module according to claim 7, wherein the axial distance from the apex of the object side surface of the fifth lens on the optical axis to the object side surface of an edge of the sixth lens is less than an axial distance from the apex of the object side surface of the fifth lens on the optical axis to the apex of the object side surface of the sixth lens on the optical axis.

10. The camera module according to claim 7, wherein an axial distance from the apex of the object side surface of the fifth lens on the optical axis to the apex of the object side surface of the sixth lens on the optical axis is greater than the axial distance from the apex of the object side surface of the fifth lens on the optical axis to the effective diameter on the object side surface of the sixth lens.

11. The camera module according to claim 7, further comprising:
a shutter and an aperture stop disposed in front of an object side surface of the first lens,
wherein the shutter and the aperture stop are spaced apart from the first lens by 0.4 millimeter or more.

12. The camera module according to claim 7, wherein a distance between the fifth lens and the sixth lens on the optical axis is within 0.1 millimeter.

13. An imaging lens comprising:
a first lens to a sixth lens arranged in order from an object side to an image side,
wherein the first lens has a positive refractive power, and the second lens and the sixth lens have a negative refractive power,
wherein an axial distance from an apex of an object side surface of the fifth lens on an optical axis to an object side surface of an edge of the sixth lens is less than an axial distance from the apex of the object side surface of the fifth lens on the optical axis to an effective diameter on the object side surface of the sixth lens,
wherein the object side surface of the sixth lens outside the edge is flat,
wherein the third lens has a meniscus shape convex to the object side, and
wherein a distance between the fifth lens and the sixth lens on the optical axis is within 0.1 millimeter.

* * * * *